July 6, 1937.  E. SANTAMARIA  2,086,366
HAND PROPELLED MOTOR
Filed Oct. 12, 1936
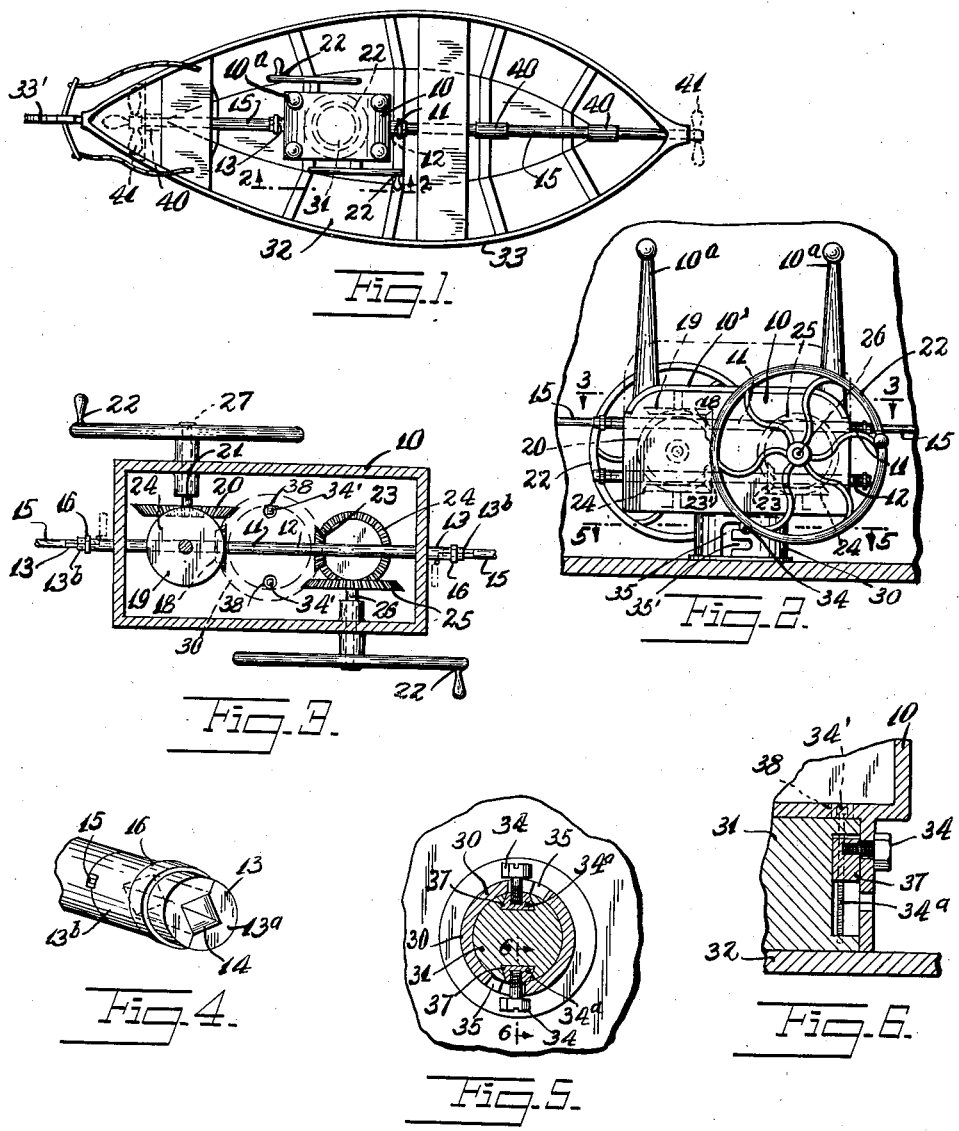
INVENTOR
Encarnacion Santamaria
BY
ATTORNEY Patented July 6, 1937

2,086,366

UNITED STATES PATENT OFFICE 2,086,366

HAND PROPELLED MOTOR

Encarnacion Santamaria, Zelaya, Nicaragua

Application October 12, 1936, Serial No. 105,173

8 Claims. (Cl. 115—24)

This invention relates to new and useful improvements in a hand propelled motor.

The invention has for an object the construction of a motor as mentioned which may be applied to a boat or other vehicle for propelling same.

A feature of the invention resides in the fact that the hand propelled motor is arranged within a casing which is adjustably mounted and adapted to be connected with transmitting shafts in various positions.

More specifically, it is contemplated to construct the motor with several different driving shafts having different characteristics which may be selectively connected with the driven shafts.

For further comprehension of the invention, and of the objects and advantages thereof, reference will be had to the following description and accompanying drawing, and to the appended claims in which the various novel features of the invention are more particularly set forth.

In the accompanying drawing forming a material part of this construction:—

Fig. 1 is a plan view of a boat with a hand propelled motor constructed according to this invention.

Fig. 2 is a fragmentary sectional view taken on the line 2—2 of Fig. 1.

Fig. 3 is a horizontal sectional view taken on the line 3—3 of Fig. 2.

Fig. 4 is a fragmentary perspective view of one of the ends or one of the shafts of the hand propelled motor.

Fig. 5 is an enlarged sectional view taken on the line 5—5 of Fig. 2.

Fig. 6 is an enlarged sectional view taken on the line 6—6 of Fig. 5.

The hand propelled motor, according to this invention includes a casing 10 from the opposite sides of which there project the ends of a top shaft 11. A bottom shaft 12 is also mounted within the casing and projects from the same ends, except at a lower elevation. Each of the ends of the shafts is equipped with a coupling device of a particular type—one which does not interfere with the swivelling of the entire motor body 10. Specifically, each coupling comprises a tubular portion 13 formed with a square opening 14 to receive the square end of a driven shaft 15. The tubular member 13 is formed from a section 13ª which is integral with the motor shaft, and a section 13ᵇ which is hingedly connected therewith by a hinge 15. A ring 16 is slidably mounted upon the shaft and is adapted to engage over the sections 13ª and 13ᵇ to hold them relatively closed.

If desired, the ring 16 may be shifted backwards to disengage from the section 13ᵇ and this section may then be pivoted open to free the held square end of the driven shaft.

The shaft 11 has a beveled gear 18 mounted on it which meshes with a gear 19, in turn meshing with a gear 20 on a shaft 21 extending through the wall of the casing 10. The outer end of the shaft 21 is provided with a handle wheel 22 by which the motor may be manually operated.

The shaft 12 is provided with a pair of pinions 23, 23' which selectively mesh with gears 24, in turn meshing with the gear 20 and a gear 25. The gear 25 is fixed on the shaft 26 which extends from the side of the casing 10 opposite the side from which the shaft 26 extends. A handle wheel 22 is mounted on the shaft 26. These handle wheels 22 are associated with key elements 27 by which they are removably supported upon the shafts. Thus, one or both of the handles may be removed when desired. The pinions 23' are materially smaller than the gears 18 and consequently the shaft 12 will rotate at a greater speed than the shaft 11 when the handle wheels 22 are uniformly turned.

The casing 10 is supported upon a hollow cylindrical support member 30. An internal cylindrical base member 31 is mounted upon the floor 32 of the boat 33 or any other device. Elements 34 project from the base member 31 and engage in bayonet slots 35 formed in the hollow cylindrical member 30 and by which the support member is supported in different positions. Each of the elements 30 are in the form of screws which are each mounted on a block 37 associated with a screw 38 by which the block may be moved upwards or downwards relative to the internal cylindrical base 31. The screws 34 are provided with heads 34' which are accessible through openings 38 formed in the body 10. This body is of hollow construction and has a removable top 10' on which vertical holding posts 10ª are mounted for holding same by one hand, while the handle wheel 22 is rotated.

The boat 33 is provided with the usual rudder 33' and a pair of aligned shafts 15 which have their adjacent ends spaced apart. These shafts extend through suitable bearings 40 mounted in the boat or other vehicle, and are connected with driving elements such as the propellers 41. In one position of the body 10 the ends of the shaft 12 are coupled with the adjacent ends of the shafts 15. If it is desired the coupling jaws 13ᵇ may be swung open by first shifting backwards the rings 16. Then the body 10 may be turned to disengage the elements 34 from the horizontal portions of the bayonet slots 35 and simultaneously this rotation will cause the tubular portions 13 to completely disengage from the shafts 15. Then the body 10 may be shifted along and thereafter turned to re-engage the elements 34 in other of the branches of the bayonet slots. The bayonet slot 35 is provided with a lower branch 35' which is spaced from the upper branch of the bayonet slot at a distance substantially corresponding to the distance between the shafts 11 and 12. In the new position of the body 10 the shaft 11 may be coupled with the shafts 15.

Should the shaft 12 be improperly aligned with the shafts 15 (depending merely upon the particular construction of boat or other device) the screws 34ª may be turned to raise or lower the blocks 37 relative to the internal cylindrical base 31. This adjustment will compensate for any deficiency in the alignment of the shaft 12 and the shafts 15. The screws 34ª have heads 34' accessible through openings 38 in the housing 10.

The operation of the device is as follows:—

When the shaft 11 is connected with the shafts 13, one or both of the handle wheels 22 may be turned for supplying power and thus rotation to the shaft 11. The shaft 12 will also rotate but will merely be idling. When the casing 10 is shifted to the raised position and the shaft 12 connected with the shafts 15 the motor may be again operated but the mechanical advantage will be varied.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, and drive units in said drive unit housing and having projecting shafts, and hinged coupling sections on said projecting shafts whereby different projecting shafts may be coupled with said propeller shafts.

2. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, and drive units in said drive unit housing and having projecting shafts, and hinged coupling sections on said projecting shafts whereby different projecting shafts may be coupled with said propeller shafts, said pair of aligned shafts being mounted in a boat and connected to drive front and rear propellers thereof.

3. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, and drive units in said drive unit housing and having projecting shafts, and hinged coupling sections on said projecting shafts whereby different projecting shafts may be coupled with said propeller shafts, said elements being adjustably mounted.

4. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, drive units in said drive unit housing and having projecting shafts, and hinged coupling sections on said projecting shafts whereby different projecting shafts may be coupled with said propeller shafts, and means for adjustably supporting said element including blocks slidably mounted upon said internal cylindrical member and held in various adjusted positions.

5. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, drive units in said drive unit housing and having projecting shafts and hinged coupling sections on said projecting shafts whereby different projecting shafts may be coupled with said propeller shafts, and means for adjustably supporting said element including blocks slidably mounted upon said internal cylindrical member and held in various adjusted positions, screws threadedly engaging the blocks and rotatively mounted on said internal cylindrical member for adjustably mounting said blocks.

6. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, drive units in said drive unit housing and having projecting shafts, and hinged coupling sections on said projecting shafts whereby different projecting shafts may be coupled with said propeller shafts, and means for adjustably supporting said element including blocks slidably mounted upon said internal cylindrical member and held in various adjusted positions, screws threadedly engaging the blocks and rotatively mounted on said internal cylindrical member for adjustably mounting said blocks, said screws having heads accessible through openings in said housing.

7. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, and drive units in said drive unit housing and having projecting shafts, and hinged coupling sections on said projecting shafts whereby different projecting shafts may be coupled with said propeller shafts, said couplings comprising tubular portions having square openings for receiving the said aligned shafts, and portions of said tubular portions being hingedly mounted, and means for holding said hinged sections in operative positions.

8. A hand propelled motor, comprising a pair of aligned propeller shafts having their adjacent ends spaced apart, a drive unit housing interposed between said shafts, a hollow cylindrical support member for said housing and having bayonet slots therein, an internal cylindrical base engaging into said hollow cylindrical support member, elements projecting from said internal cylindrical base and engaging in said bayonet slots to support same in adjusted positions adjustable when in certain turned positions, and drive units in said drive unit housing and having projecting shafts, and hinged coupling sections on said projecting shafts whereby different projecting shafts may be coupled with said propeller shafts, said couplings comprising tubular portions having square openings for receiving the said aligned shafts, and portions of said tubular portions being hingedly mounted, and means for holding said hinged sections in operative positions, including rings slidably mounted upon said tubular portions and engageable over said hinged portions.

ENCARNACION SANTAMARIA.